United States Patent Office 2,740,764
Patented Apr. 3, 1956

2,740,764
POLYMERIZATION OF ETHYLENICALLY UNSATURATED POLYESTERS WITH VINYL COMPOUNDS

Günther Nischk, Leverkusen-Wiesdorf, and Karl Erwin Müller and Otto Bayer, Leverkusen-Bayerwerk, Germany, assignors to Farbenfabriken Bayer Aktiengesellschaft, Leverkusen, Germany, a corporation of Germany No Drawing. Application November 13, 1952,
Serial No. 320,342

Claims priority, application Germany December 1, 1951

6 Claims. (Cl. 260—45.4)

The present invention relates to the production of copolymers and to the copolymers thus obtained.

In our copending application Serial No. 278,508 filed March 25, 1952, we have described various methods of producing copolymerizable compounds by chemical addition of saturated condensation products or polymers containing free hydroxyl groups to unsaturated compounds. After the addition reaction at least one unsaturated group is to be preserved so as to render possible the copolymerization with polymerizable unsaturated monomeric compounds such as styrene.

Suitable saturated condensation products or polymers according to the above said application are for instance polyesters containing hydroxyl groups and polymers or copolymers of vinyl acetate containing partly or completely saponified hydroxyl groups. Examples of unsaturated compounds to which the above said saturated compounds are added are especially the compounds wherein at least one double bond is preserved after the addition reaction. Such compounds include polyesters of maleic acid, ethylene glycol diacrylate, maleic anhydride and hexahydrotriacrylyl-s-triazine.

The unsaturated polymers or condensation products mentioned in the above named copending application can be polymerized with peroxides in the presence of styrene. Polymerization must be carried out at temperatures at which decomposition of the peroxide into radicals occurs. A reaction temperature of 100° C. is to be applied if the polymerization is carried out in the presence of benzoyl peroxide as catalyst. At lower temperature, for instance at room temperature, the said polymerizable mixtures, reacted in the presence of benzoyl peroxide, are storable over a prolonged period.

According to our copending application Serial No. 306,718 polyester-resins are obtained by copolymerization of unsaturated polyesters and saturated polyesters with vinyl compounds in the presence of peroxides. In this reaction the saturated polyesters probably act as softeners.

We have now found that mostly glass-clear copolymers are obtained, which harden in a shorter period of time even at temperatures substantially below 100° C., say between 25–60° C., by copolymerizing unsaturated or saturated polyesters, for instance those described in our copending applications Serial No. 278,508 filed March 25, 1952, and Serial No. 306,718, filed August 27, 1952, or any desired mixtures of said polyesters, at least one of said polymers being prepared by condensation of the monomer and a secondary amine of the following formula:

R—NH—(CH$_2$)$_n$—X in which:

R means alkyl, with preferably 1 to 18 carbon atoms, aryl, preferably phenyl, toluolyl, diphenyl, naphthyl and aracyl or aralkyl, X means —NHR, OH, COOH, NH$_2$, n means an integer from 1 to 6.

with monomeric vinyl compounds in the presence of reaction accelerators. Organic peroxides, for instance benzoyl peroxide and cumene peroxide, are preferably employed as catalysts during condensation.

Secondary amines which correspond to the above formula include hydroxy ethyl aniline, hydroxy ethyl naphthyl amines, hydroxy ethylamino diphenyls, N-phenyl-ethylene-diamine and N-phenyl-β-alanine. Typical examples of condensation products for the incorporation of the said secondary amines are the soluble unsaturated linear and branched polyesters which are obtainable by condensation in known manner from dibasic and polybasic saturated and unsaturated carboxylic acids and from polyhydric alcohols, amino-alcohols and diamines; furthermore, the unsaturated polyesters named in our copending application Serial No. 278,508.

It is, of course, within the scope of our present invention to incorporate the above said secondary amines also or exclusively in the saturated polyesters which makes it possible to conduct the copolymerization reaction at room temperature.

The secondary amines are incorporated in quantities of 0.01–25 per cent calculated on the saturated or unsaturated polyesters. After compounding with styrene and adding benzoyl peroxide copolymerization starts at temperatures from between 25–60° C. The reaction requires some minutes or some hours to complete depending on the quantity of the peroxide present. The addition of 1 per cent of benzoyl peroxide effects polymerization after one hour. Other peroxides such as cumene peroxide and lauroyl peroxide may also be employed.

Heretofore, it has been known only to polymerize unsaturated polyesters with unsaturated, monomeric vinyl compounds in the presence of benzoyl peroxide by incorporating tertiary amines, for instance dimethylaniline, at room temperature. The resultant copolymers always give off a disagreeable odor of tertiary amine and show a high degree of discoloration. Furthermore, undiluted tertiary amines, for instance dimethylaniline, give explosive reactions. When the tertiary amine is not intimately mixed with the polymerizable mixture deflagrations of the peroxide readily occur.

The copolymers obtained according to the invention are void of the disadvantages associated with the compounds produced by the hitherto known methods. They fundamentally differ in that secondary amines are chemically incorporated with the polyesters. The new copolymers are completely odorless and have a minimum of discoloration.

The invention is further illustrated by the following examples, the parts being by weight.

Example 1

146 parts of adipic acid, 148 parts of phthalic anhydride, 196 parts of maleic anhydride, 250 parts of glycol and 15 parts of hydroxy ethyl aniline are condensed at an internal temperature of 200–10° C. until no further water distils over. The residual portions of water are distilled off in vacuum at an internal temperature of 200° C. under 15 mm. pressure; the temperature is allowed to drop to 160° C. and 0.6 part of hydroquinone is added. When the temperature has dropped to 110–5° C. 285 parts of styrene are added and the mixture is stirred for about 30 minutes at decreasing temperature. The solution is reacted with 2 per cent of benzoyl peroxide and cast into molds. By heating to 45–50° C. polymerization starts after about 45 minutes. The resins obtained are yellow, glass-clear and insoluble in all solvents.

Example 2

296 parts of phthalic anhydride, 196 parts of maleic anhydride, 250 parts of glycol and 15 parts of hydroxy ethyl aniline are condensed to yield an unsaturated polyester as described in Example 1. When the water content has been completely removed from the equilibrium the mixture is allowed to cool to 160° C., 0.6 part of hydroquinone is added and the mixture is stirred with 285 parts of styrene at 110–5° C.

2 per cent of benzoyl peroxide are introduced into the solution thus obtained. By heating the mixture to 50° C. polymerization starts after about 45 minutes. A clear resin which is very fast to solvents is obtained.

Example 3

450 parts of the unsaturated polyester obtained according to Example 1 are heated to 100° C. and 200 parts of a saturated polyester are added, which was prepared from 876 parts of adipic acid, 1332 parts of phthalic anhydride and 1030 parts of glycol by esterification; 0.85 part of hydroquinone is added and 257 parts of styrene are run in.

The clear solution obtained is reacted with 1 per cent of benzoyl peroxide and heated to 45–50° C. Polymerization is complete after 50 minutes. Glass-clear, synthetic resins which are fast to solvents are obtained.

Example 4

100 parts of a saturated polyester prepared from 876 parts of adipic acid, 1332 parts of phthalic anhydride, 1025 parts of glycol and 25 parts of β-hydroxy-ethyl-naphthylamine, are dissolved in 130 parts of styrene; 200 parts of an unsaturated polyester prepared from 876 parts of adipic acid, 880 parts of phthalic acid, 1176 parts of maleic anhydride and 1590 parts of glycol are added to the above solution at 100° C.

2 per cent of benzoyl peroxide are dissolved in the copolymerizable solution thus obtained which is heated to 45–50° C. Polymerization is complete after about 45 minutes and a clear resin which is fast to solvents is obtained.

Example 5

73 parts of adipic acid, 74 parts of phthalic anhydride, 98 parts of maleic anhydride, 125 parts of glycol and 8 parts of p-methyl-hydroxyethyl-aniline are condensed to form a polyester. The yellow polyester is reacted with 0.5 part of hydroquinone at 160° C. and mixed while stirring at 100° C. with 140 parts of styrene. Thereafter 90 parts of the saturated polyester obtained as described in Example 3 are dissolved in the solution to which 1 per cent of benzoyl peroxide is added. Polymerization starts after about 40 minutes at room temperature. A glass-clear, yellow copolymer is obtained.

We claim:

1. The process for the production of copolymers which comprises reacting a vinyl compound and a polyester obtained by the condensation of a polyhydric alcohol, at least one polycarboxylic acid, at least one of said acids being an ethylenically unsaturated carboxylic acid and a secondary amine of the formula R—NH—$(CH_2)_n$—X, in which X is a member selected from the group consisting of COOH, $NH_2$, OH and NHR, R is a member of the group consisting of alkyl and aryl and $n$ is an integer from 1–6.

2. The process for the production of copolymers which comprises reacting in the presence of a peroxide, a vinyl compound and a polyester obtained by the condensation of a polyhydric alcohol, at least one polycarboxylic acid, at least one of said acids being an ethylenically unsaturated carboxylic acid and a secondary amine of the formula R—NH—$(CH_2)_n$—X, in which X is a member selected from the group consisting of COOH, $NH_2$, OH and NHR, R is a member of the group consisting of alkyl and aryl and $n$ is an integer from 1–6.

3. The process for the production of copolymers which comprises reacting styrene and a polyester obtained by the condensation of a polyhydric alcohol, at least one polycarboxylic acid, at least one of said acids being an ethylenically unsaturated carboxylic acid and a secondary amine of the formula R—NH—$(CH_2)_n$—X, in which X is a member selected from the group consisting of COOH, $NH_2$, OH and NHR, R is a member of the group consisting of alkyl and aryl and $n$ is an integer from 1–6.

4. The process for the production of copolymers which comprises reacting in the presence of a peroxide, styrene and a polyester, obtained by the condensation of a polyhydric alcohol at least one polycarboxylic acid, at least one of said acids being an ethylenically unsaturated carboxylic acid and a secondary amine of the formula R—NH—$(CH_2)_n$—X, in which X is a member selected from the group consisting of COOH, $NH_2$, OH and NHR; R is a member of the group consisting of alkyl and aryl and $n$ is an integer from 1–6.

5. The process for the production of copolymers which comprises condensing a vinyl compound and a polyester obtained by the condensation of a polyhydric alcohol, at least one polycarboxylic acid, at least one of said acids being an ethylenically unsaturated carboxylic acid and a secondary amine of the formula R—NH—$(CH_2)_n$—X, in which X is a member selected from the group consisting of COOH, $NH_2$, OH and NHR, R is a member of the group consisting of alkyl and aryl and $n$ is an integer from 1–6, in the presence of a polyester obtained by the condensation of a polyhydric alcohol and a polycarboxylic acid which is devoid of aliphatic carbon-to-carbon unsaturation.

6. The process for the production of copolymers which comprises condensing in the presence of a peroxide, a vinyl compound and a polyester obtained by the condensation of a polyhydric alcohol, at least one polycarboxylic acid, at least one of said acids being an ethylenically unsaturated carboxylic acid and a secondary amine of the formula R—NH—$(CH_2)_n$—X, in which X is a member selected from the group consisting of COOH, $NH_2$, OH and NHR, R is a member of the group consisting of alkyl and aryl and $n$ is an integer from 1–6, in the presence of a polyester obtained by the condensation of a polyhydric alcohol and a polycarboxylic acid which is devoid of aliphatic carbon-to-carbon unsaturation.

References Cited in the file of this patent

UNITED STATES PATENTS

| | | |
|---|---|---|
| 2,449,299 | Hurdis | Sept. 14, 1948 |
| 2,450,552 | Hurdis | Oct. 5, 1948 |